INVENTORS.
VINCENT G. BELL, JR
DUNSTAN P. SHELDON
BY Howson & Howson
ATTYS.

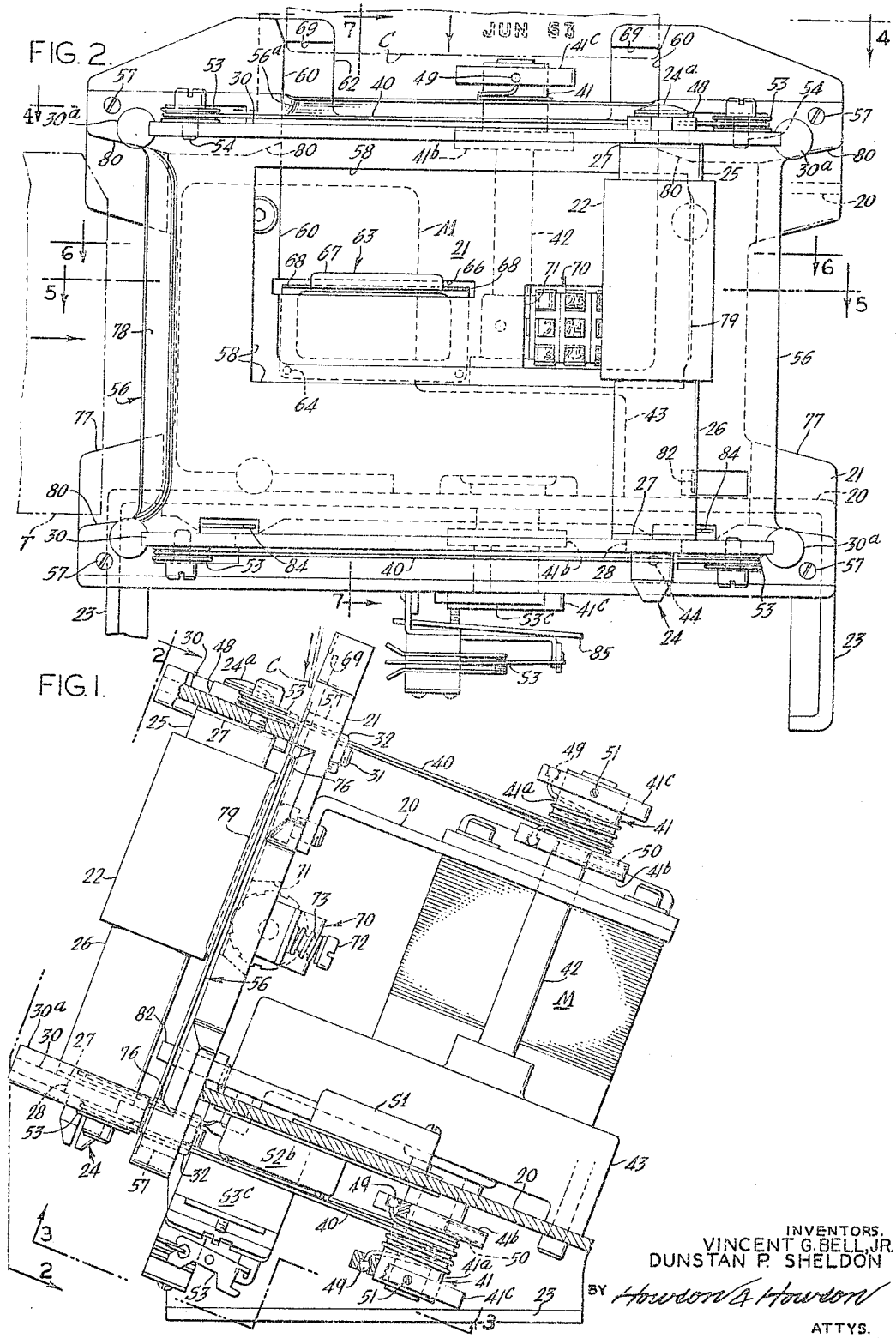

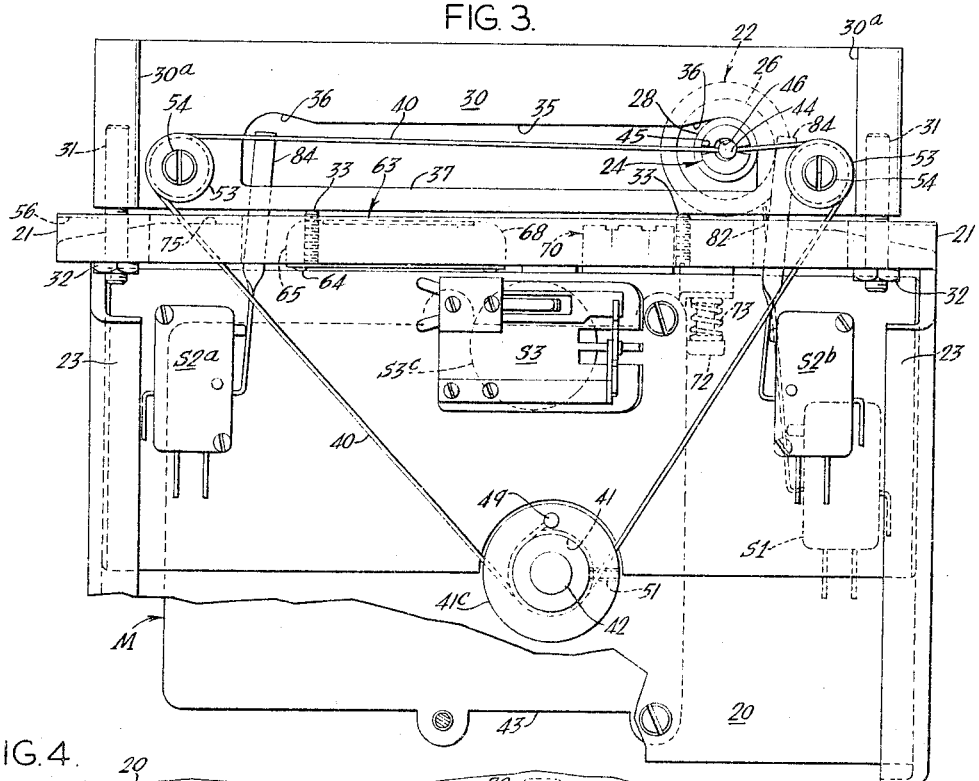

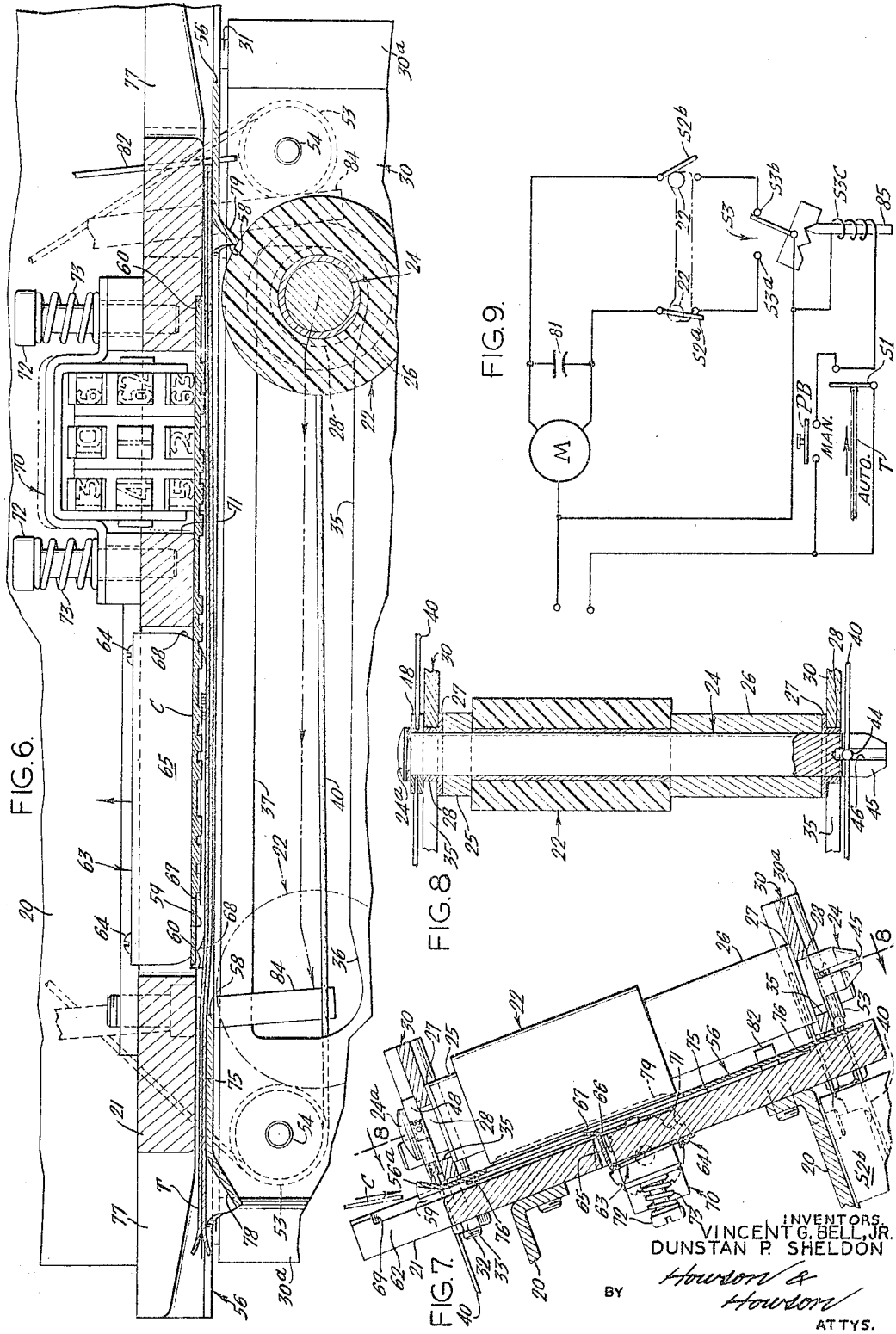

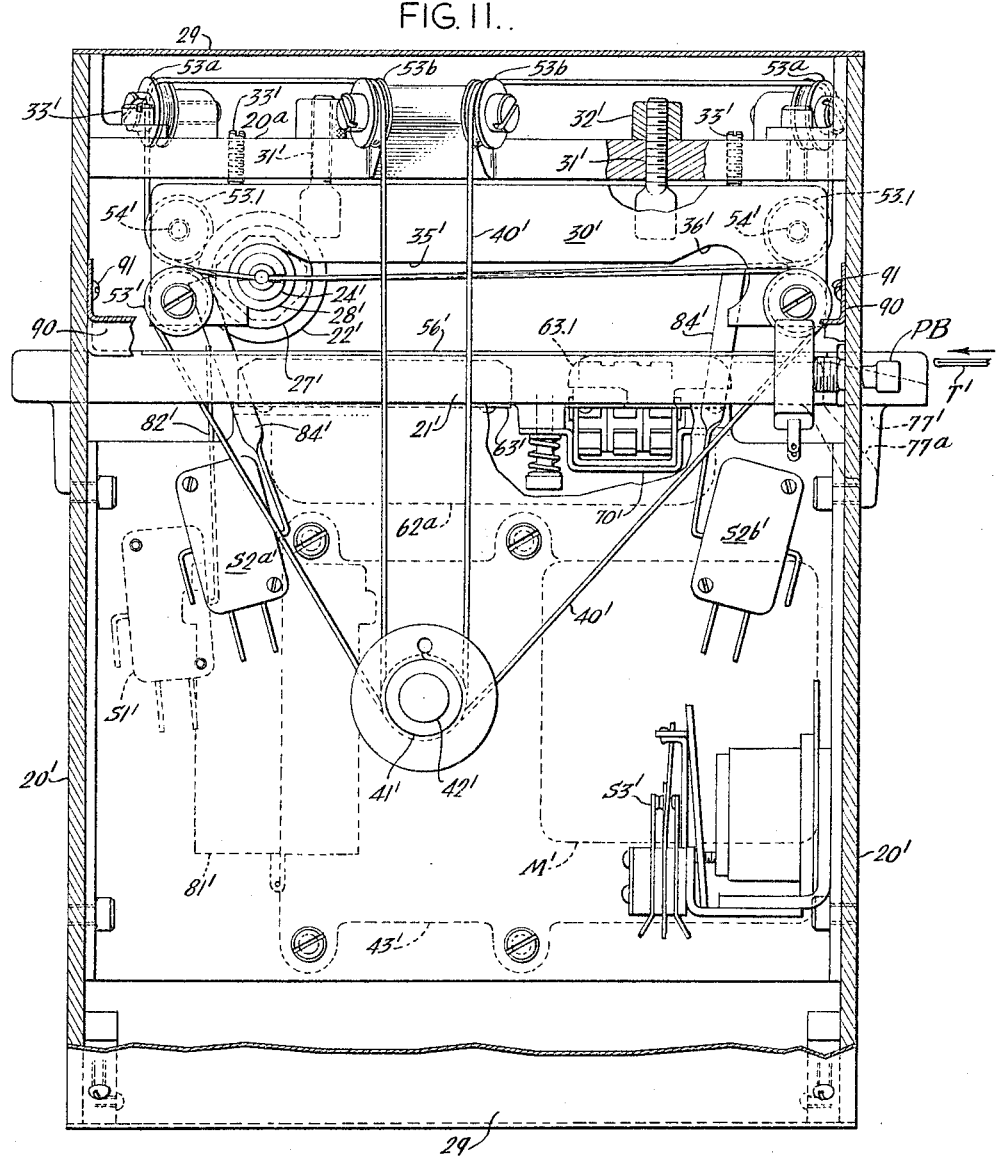
FIG. II.
INVENTORS.
VINCENT G. BELL, JR.
DUNSTAN P. SHELDON
BY Howson & Howson
ATTYS

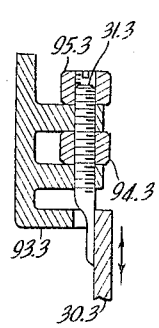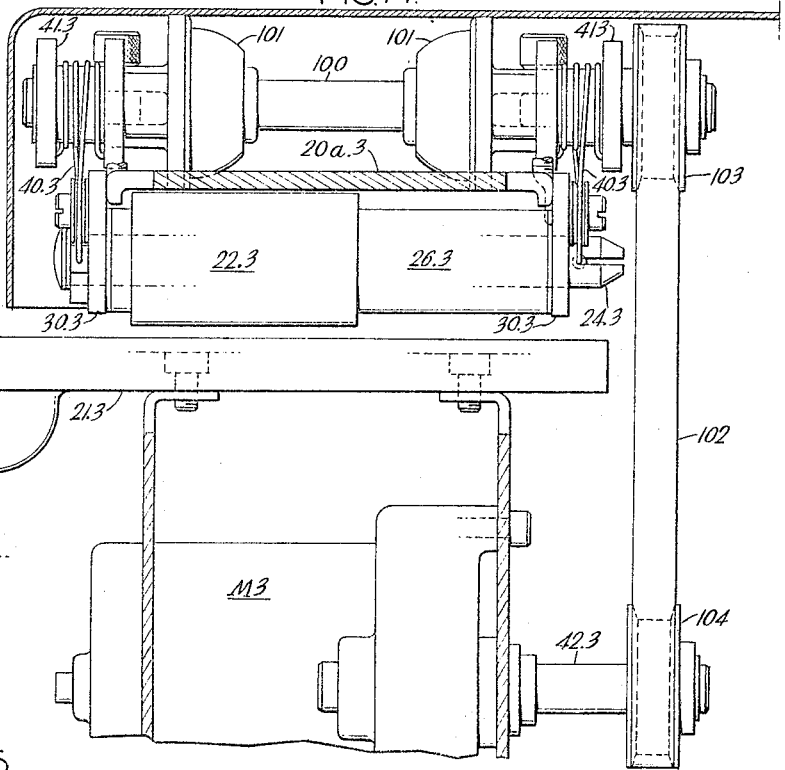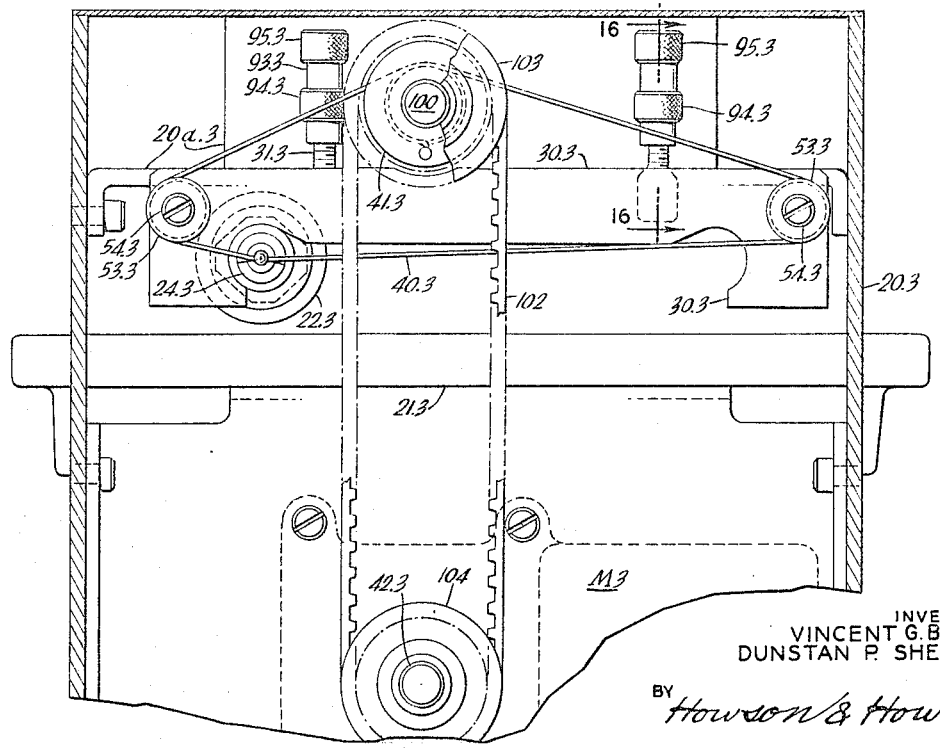

INVENTORS.
VINCENT G. BELL, JR.
DUNSTAN P. SHELDON
BY
Howson & Howson
ATTYS

Aug. 30, 1966 V. G. BELL, JR., ETAL 3,269,307
IMPRINTING MACHINE WITH RECIPROCATING CYLINDER
Filed Sept. 4, 1963 8 Sheets-Sheet 8

INVENTORS.
VINCENT G. BELL, JR.
DUNSTAN P. SHELDON
BY
Howson & Howson
ATTYS.

United States Patent Office 3,269,307
Patented August 30, 1966

3,269,307
IMPRINTING MACHINE WITH RECIPROCATING CYLINDER
Vincent G. Bell, Jr., Stratford, Wayne, and Dunstan P. Sheldon, Daylesford, Pa., assignors, by mesne assignments, to Dashew Business Machines, Inc., Los Angeles, Calif., a corporation of Delaware
Filed Sept. 4, 1963, Ser. No. 306,470
10 Claims. (Cl. 101—269)

This invention relates to an imprinting machine of the type which provides a platen for holding a credit card and/or other printing elements or media together with a ticket or invoice to be imprinted and an imprinting roll for squeezing the ticket, invoice, or other impression receiving media down on the printing media to make the printing impression thereon, and has for an object the provision of improvements in this art.

It has heretofore been proposed to provide imprinting apparatus comprising a cam track for holding an imprinting roll against a platen for reciprocatory movement to print upon a ticket. Various means have also been provided for raising the roll at one or both ends of its travel to clear the space for feeding in a ticket or card.

Furthermore, it has heretofore been proposed to provide power operated means for moving the roll back and forth; but such means have usually included screw shafts, racks or the like, which were complex, heavy, noisy, binding, oily and troublesome.

Accordingly, it is an object of the present invention to provide an improved machine of the general type referred to which comprises improved cam and roll traversing means for holding down and moving the imprinting roll on its working stroke and for raising it at the end of a stroke.

Another object is to provide improved means for moving the roll back and forth, the same means serving to raise the roll at the end of a stroke.

Another object is to provide improved power drive connections for the roll.

Another object is to provide improved means for holding a credit card and invoice set, generally referred to herein as a ticket, to secure accurate positioning and registration.

Another object is to provide improved means for adjusting the cam track bar relative to the platen.

Another object is to provide a cable drive arrangement for the imprinting roll which aids in separating the roll from the platen at one or both ends of a stroke.

Another object is to provide a cable drive arrangement with improved means for anchoring and adjusting the ends of the cable.

Another object is to provide means for quickly releasing or securing a roll to provide for quick exchange of rolls.

Another object is to provide improved means for controlling the operation of the roll, particularly for reversing its travel and for initiating its movement each time a ticket is inserted.

In one embodiment of the invention the ends of the space between the imprinting roll and the platen are closed off where such space is not needed, as when printing from small credit cards; and in another embodiment the space is left completely clear in what will be referred to as an open-throat arrangement to take material of any width, the other parts being arranged to provide for this, as will be seen.

The above and other objects of the invention, as well as various features of novelty and advantages, will be apparent from the following description of an exemplary embodiment, reference being made to the accompanying drawings thereof, wherein:

FIG. 1 is an end elevation of an imprinter adapted to have a credit card of limited length inserted at the top and a ticket inserted from one end, portions of the end structure being broken away to more clearly show the assembled imprinter;

FIG. 2 is a front view of said imprinter taken from the planes indicated by line 2—2 of FIG. 1;

FIG. 3 is a bottom view of FIG. 1 with a portion broken away and as viewed from the planes indicated by line 3—3 of FIG. 1;

FIG. 4 is a fragmentary sectional view taken in transverse planes indicated by line 4—4 of FIG. 2;

FIG. 5 is a fragmentary sectional view taken in a transverse plane indicated by line 5—5 of FIG. 2;

FIG. 6 is a fragmentary enlarged sectional view taken in the plane indicated by line 6—6 of FIG. 2 and showing a ticket and credit card in position for an imprinting operation;

FIG. 7 is an enlarged transverse section taken on the line 7—7 of FIG. 2;

FIG. 8 is a section taken on the line 8—8 of FIG. 7;

FIG. 9 is a wiring diagram;

FIG. 11 is a view looking upward toward the bottom of FIG. 10;

FIG. 14 is a partial elevational view of a modified form of open-throat imprinter, the view being similar to FIG. 10 but turned at an angle to place the platen in a horizontal position, this form of device providing shorter cable or strand runs than the FIG. 10 form;

FIG. 15 is a right end elevation of the parts shown in FIG. 14;

FIG. 16 is a section through a cam track adjusting unit, the view being taken on the line 16—16 of FIG. 15;

Figure 10:
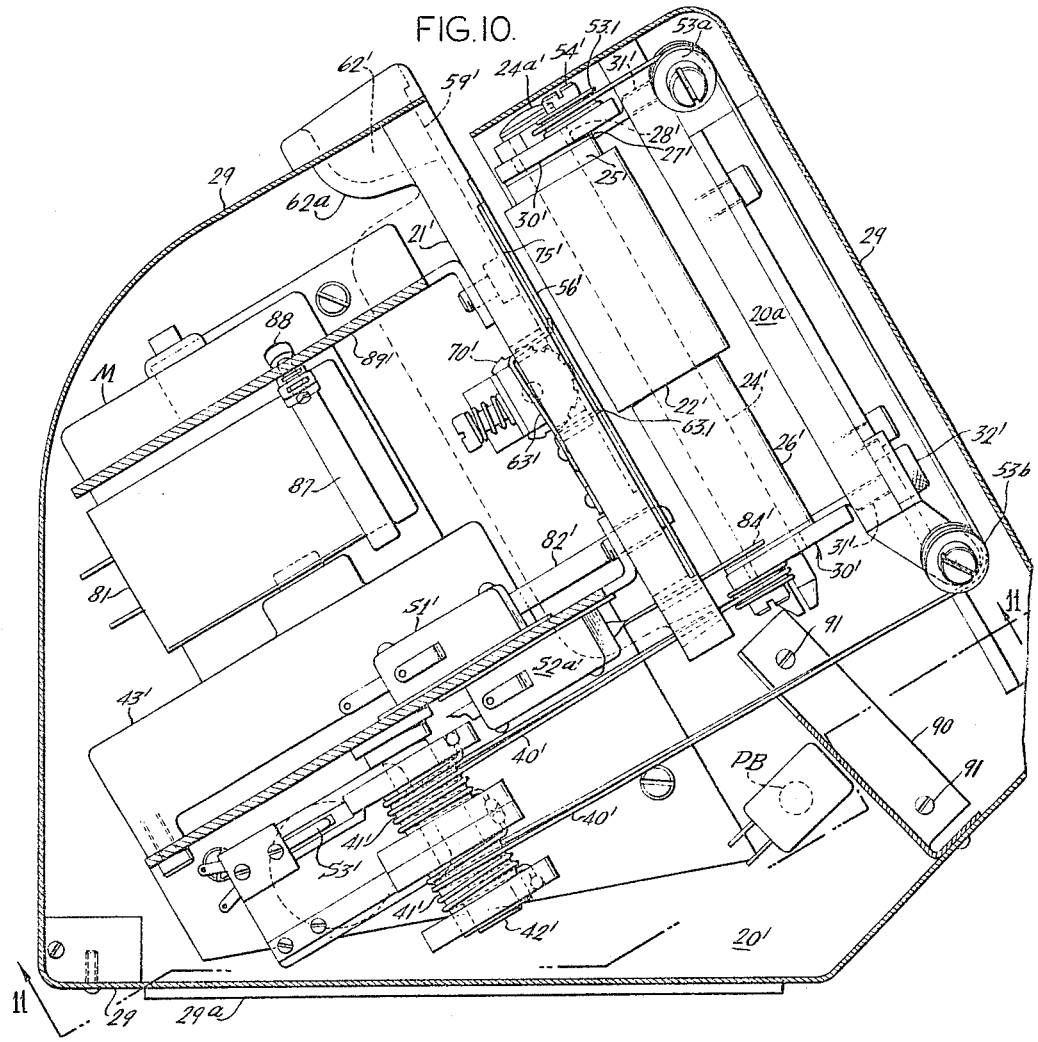
FIG. 10 is an end elevation of a modified form of imprinter of the open-throat type which will take material of any width.

For general orientation, it is first to be noted that this imprinter is built upon a frame, generally designated by the numeral 20, which is adapted to be disposed in various turned positions relative to a horizontal plane or table on which the device is to be used; that is, the surface of a platen 21 and the axis of an imprinting roll 22 may have various turned positions with reference to a horizontal plane. In the embodiments shown herein the surface of the platen 21 is inclined about 20 degrees from a vertical plane but for some uses the platen may be horizontal and the mechanism will most readily be understood by viewing it from a position in which the platen is horizontal. For FIG. 1, this aspect is obtained by looking at the figure from the right side of the sheet above the bottom corner. To hold the device in the position shown there are secured to what would basically be called the side of the frame 20, two wedge-shaped base supports 23.

The imprinting roll may be either of the dry type or the inking type, depending on whether the top sheet of a ticket pad is intended to receive printing from above or not. The lower sheets can be printed through interleaved carbon sheets, as is usual. If the roll is of the printing type it can be of a particular known type which has ink in its porous body so as to ink the top sheet over the raised printing elements by pressure. Since these ink-containing imprinting rolls may need to be changed fairly frequently it is arranged herein that the roll mountings will provide rapid removal and replacement, as for example by having an endwise removable shaft 24 on which the imprinting roll 22 rotates. Spacers 25 and 26 at the ends of the imprinting roll may also rotate on the shaft and hold the roll in position between two laterally spaced cam track rails 30 which are secured, preferably adjustably, to the frame to carry the roll shaft and roll for pressure reaction relative to the platen.

In the first embodiment shown herein where both ends (reference to shaft ends) of the space between platen and roll is closed off, the rails are secured at their ends to the ends of the platen itself (FIGS. 3 and 4), as by headed screws 31 threaded into enlargements 30a on the ends of the cam rails and passing through holes in the platen. Herein, a turnable nut 32 serves as the screw head and the screw has a screwdriver slot in its end. Space adjusting stop screws 33 in the platen regulate the distance between the platen and the roll to accommodate for different thicknesses of ticket pads, or roll diameters, or pressure desired, and the like.

The shaft 24 could be secured against axial displacement, if desired, but where it is disposed with one end elevated, as shown herein, it is sufficient to provide a head 24a on its upper end so it will retain its position by its weight.

The cam rails 30 are provided each with a cam reaction surface 35 and a raised pressure relief portion 36 at one or both ends. The single stroke device shown herein has relief at each end to allow the roll to rise so a card and ticket can be freely inserted. A lower surface 37 may be provided to aid in guiding the roll but may be omitted, if desired. Hardened end spacers 27 are provided with reduced end portions 28 which ride in the cam slots of the cam rails.

Means are provided for traversing the roll shaft 24 with its roll and spacers along the cam track of the rails, the means shown herein comprising, at each end of the shaft, flexible means, such as a strand in the form of a cable 40, as of stranded stainless steel, secured to an end of the shaft and passing over suitable sheaves to power drive means, such as the drum or capstan 41 of a power drive shaft 42. The shaft 42 is reversibly driven through a gear drive unit 43 from a motor M. The reversible drive could be arranged in various ways but is here arranged to be obtained by reversing the motor M. Preferably the motor and gear box are made as a single unit or subassembly which can be secured in various locations on the frame as may be desired.

As shown in FIG. 3, one of the cables 40 is connected with the end of the shaft 24 by providing an enlargement 44 on the cable and providing a transverse end slot 45 in the shaft to receive the cable, the slot having an enlarged axial bore 46 to receive the cable enlargement 44. When the shaft is pushed into operative position its slotted end embraces the cable.

As shown in FIG. 4, the other cable 40 is connected to a washer 48 which is positioned on the shaft 24 when it is pushed into operative position, the washer here being shown as generally hexagonal. The ends of the cable are here brazed in holes in the washer.

As shown in FIGS. 1 and 3, the other ends of each cable are wound in opposite directions on the cylindrical portion 41a of the drum or capstan 41 and the ends of the cables are secured to opposite ends of the drum, as by having end enlargements 49 of the cables secured in outer enlarged recesses of holes in the end flanges 41b, 41c of the drum. One of the flanges, as 41b, may be made integral with the cylindrical portion 41a of the drum and the other end flanges, as 41c, may be separately formed and turnable on the cylindrical portion 41a of the drum. The drum is secured to the power shaft 42, as by a set screw 50, and the end flange 41c is secured to the cylindrical portion of the drum, as by a set screw 51.

By this arrangement the drum winds one end of the cable in as it unwinds the other end, with the result that the imprinting roll shaft with the imprinting roll thereon is moved back and forth along the cam track with the cables held tight at all times. The cylindrical portion of the drum is of such size as to hold as much length of cable as necessary to avoid overlapping which might effect the tension in the cable.

Initially, the cable on the main part of the drum is properly positioned when the imprinting roll is at one end of its stroke and the main part of the drum is secured to the power shaft 42 by tightening the set screw 50; and thereafter the flange 41c is turned until the other end of the cable is wound tight and then the flange 41c is secured by tightening the set screw 51.

Intermediately, as shown in FIG. 3, a cable 40 passes over grooved sheaves or pulleys 53 turnably mounted on fixed shafts 54 secured to the rail at opposite ends of the cam slot. The shaft 54 are secured with their axes spaced considerably above the longitudinal line of movement of the roll axis along the cam track to pull the imprinting roll shaft 24 upward into the relief portions 36 at the ends of the cam track. This avoids the need for inclined end portions of the cam track for raising the imprinting roll clear at the ends of the strokes.

As shown in FIG. 2, an invoice cover or ticket holddown plate is secured to the platen, as by screws 57, and is provided with an opening 58 to expose the ticket and printing indicia therebelow to the pressure of the imprinting roll 22.

The platen at one side is provided with a recess 59 (FIGS. 6 and 7) having side walls 60 to receive a credit card C, the platen being formed with an edge recess 62 to provide space for grasping the card and the plate 56 being provided with a bent edge flange 56a for guiding the card into the slot.

Stop means are provided for engagement by the forward or inner edge of the credit card C to place it in accurate position when inserted. As shown in FIGS. 6 and 7, the stop and positioning means hereby provided includes a spring plate 63 secured beneath the platen, as by screws or drive pins 64, the spring plate 63 having a bent flange 65 extending through a slot 66 in the platen. The flange 65 has a laterally bent flange 67 or flange elements between its ends, leaving upstanding end ears 68 with inclined end edges for guiding a ticket pad T up over the credit card. The flange 67 prevents the credit card from being pushed past the top of the upstanding stop flanges 65 due to downward yielding of the body of the plate 63, this being made yieldable purposely to allow the imprinting roll to push the stop flange down out of the way during printing.

The platen recess for the credit card C is provided with an outer vertical edge 69 for retaining the credit card when inserted.

When desired, supplemental printing elements or indicia may be provided on the platen. Herein a dating device 70 of known form is mounted in an opening 71 in the platen, as on headed screw posts 72 secured in the platen, the dating device being urged upward to a limiting upward position, as by springs 73 on the posts. The dating wheels are separately turnable, as by hand, to change the date and when so turned will hold their position in known manner. If desired, a guide-over flange with inclined edges may be provided to guide the ticket over the printing elements of the dating device; but inasmuch as it is here located alongside of the credit card and since the ticket will have been already raised above the credit card, there is no need for additional lifting means.

As shown in FIGS. 6 and 7, the platen 21 is provided with a recess 75 for the ticket pad, the recess having side walls 76 for guiding the edges of a ticket and the platen having an end recess 77 for exposing an end of the ticket to be grasped by the fingers.

The platen is so shaped that a ticket could be fed in at either end; but the particular machine of the first embodiment shown herein has the hold-down plate 56 shaped specifically for the insertion of a ticket from one end only, the left end, FIGS. 2 and 6, the hold-down plate for this arrangement being provided with a bent up flange 78 at the entrance end and a bent up flange 79 at the downstream edge of the main opening 58. Wherever the guide sidewalls 76 are discontinuous, as they need to be on the credit card insertion side and at other places, they are provided with tapered portions 80 to prevent the ticket corners from being caught.

In FIG. 6 a ticket T is shown in a fully inserted position. A credit card C is also shown in fully inserted position.

The stop means 65, 67 for the credit card C have already been described. The stop means for the ticket T comprises an operating arm 82 of a switch S1 which is arranged to initiate each starting cycle of the motor M. The location of the box or casing of the switch S1 and the operating arm 82 therefor are shown in FIG. 3. The opening in the platen for the switch operating arm 82 is of limited length so that the arm is stopped after the switch has been operated to avoid bending the arm.

If tickets are not sufficiently stiff and rigid to operate a switch or if a sheet is inserted from the top above the ticket cover plate, as may be done, to take an impression at the opening 58, a push button PB or other hand operated switch may be used for starting a cycle.

Means are provided for stopping operation after the roll has made a single stroke in one direction. As shown, stop switches S2a and S2b are provided at the opposite ends of the stroke, each having an operating arm 84 (FIG. 3) extending through a hole in the platen to a position where it will be engaged by one of the spacers on the roll shaft, here the long one 26. FIG. 2 shows one switch arm, the one at the right, as having just been actuated. The hole in the platen for an arm is of limited length so as to form a stop for the arm after the switch has been actuated to prevent damage thereto.

Means are provided for reversing the motor between each actuating cycle. This may be done either at the beginning or end of a cycle. As here shown it is done at the beginning of a cycle by a reversing switch S3 of the snap-over type which, as shown in FIGS. 1, 2 and 3, is operated by an armature 85 of a solenoid coil S3–C each time the ticket-actuated switch S1 is closed. The snap-over switch shown is a commercial device made by Guardian Electric Co. #58999.

When contact S3a is closed a line is connected to stop switch S2a which causes the motor M to operate in the direction to move the roll toward the end of the cam groove at which the arm 84 for the stop switch S2a is located. When it reaches that end it opens switch S2a and stops the cycle. At the next operation of switch S1 the solenoid S3–C will be energized and the line to the other stop switch will be connected and the motor will be operated in the direction toward switch S2b to open it and stop operation.

FIG. 9 shows a representative circuit diagram with all the parts heretofore described in their operative relationships for the motor. Additionally, a capacitor 81 is provided to minimize sparking and increase starting torque. The push-button PB is arranged in parallel with the ticket-operated switch S1 so that either will start operation. There are occasions when it is desirable to insert a sheet, pack or other medium which does not fit the ticket recess or pocket and, as will be obvious, such medium can be inserted above the ticket cover plate and still have the roll traverse it over the printing media in the open space of the cover plate to make an impression.

The embodiment shown in FIGS. 10 and 11 has the same basic operating parts as the first embodiment and they will be referred to by the same reference characters with a prime (′) added. The main difference is that the second embodiment is of the open throat type whereas the first embodiment is not.

There is a frame 20′, which is suitably changed to meet the requirements of the shifted cam rails and motor drive mounting, to which a platen 21′ is secured. An imprinting roll 22′ occupies the same relationship to the platen as before. A cover 29 with a base pad 29a serves in place of the wedge-shaped base members for supporting the machine in proper position. The orientation is the same as before.

A shaft 24′ with a head 24a′ is removably mounted as before. There is a short spacer 25′, a long spacer 26′, and a hardened washer-like member 27′ with an extension 28′.

The frame 20′ is provided with a transverse plate-like part 20a on which the rails 30′ are secured by screws 31′ with nuts 32′ acting against positioning screws 33′. In order to provide a shortened assembly and accommodate cable support pulleys, to be described, the screws 31′ are secured to the cam rail 30′, as by brazing, welding, riveting, small screws or the like, at a distance from the ends (FIG. 11).

The cam track rails have active cam surfaces 35′ and relief portions 36′ at the ends but the lower portion which was not active has been cut out for convenience in assembling.

A cable 40′ is provided as before on each side, being secured to and operated by a capstan 41′ on a power drive shaft 42′ of a gear drive unit 43′ operated by a motor M′. The cables for both sides are arranged on sheaves at the end of the cam tracks which are so disposed as to lift up the roll shaft and roll at relief portions 36′ at the ends. The cable on one side extends down alongside the frame in approximately a plane to the capstan. However, because of the open throat arrangement which is left unobstructed, the cable for the other side passes above and around the cam rails to a capstan 41′ which is placed on the same end of the drive shaft as the other capstan and adjacent thereto, as shown in FIG. 10.

The sheaves 53.1 on shafts 54′ for the longer indirect cable 40′ are secured to the ends of the rail with the cable on the lower side (FIG. 11). The cable parts then pass over angularly arranged sheaves 53a and 53b, suitably supported on the plate-like top part 20a of the frame, thence down to the capstan. The cable connections to the capstans and imprinting shaft are the same as before and need not be described again.

There is a hold-down plate 56′, as before, with an opening to expose the credit card (not shown) and dating device 70′ to the ticket, as before. Also there is a recess 59′ in the platen for a credit card inserted from the top and a recess 75′ for the insertion of a ticket from one end. The details of the credit card recess, the ticket recess, the hold-down plate, and the dating device are the same as before and need not be described again.

There is a grasping recess 62′ in the platen at the top for credit card and here the platen is formed with an enclosure 62a for one side of the card which extends out to the cover 29 so that only a thin opening to receive the card is left in the enclosure.

A spring plate stop device 63′ for the credit card is provided, as before. A similar spring guard 63.1 is provided at the dating device, this having rounded corners to ease the ticket past.

A grasping recess 77′ for the ticket is provided at the end at which it is inserted and the platen is provided with an enclosure 77a which mates with a part of the casing to form a full enclosure except a narrow slit to pass the ticket.

By suitable change which can readily be made the recess enclosure can be made at the other end of the platen when a ticket is to be fed in at the other end. Otherwise there is no change in the platen except that either recess end not used may be cut off. The operating arm 82′ and switch S1′ would be suitably shifted for feed in at the other end.

The operating arms 84′ for the stop switches S2a′ and S2b′ are shown in FIG. 11. The reversing switch S3′ and its operating mechanism are shown in FIG. 11. A condenser or capacitor 81′ is shown in FIG. 10 to be mounted by a clamp band 87 and screw 88 to a frame bracket 89.

An interior supporting and stiffening rail 90 for the casing 29 is secured by screws 91 through its flanges to the end plates 20′ of the frame.

It has been explained that in the open throat embodiment the top and ends of the space above the platen cover plate are completely open for the insertion of any desired medium of any size to take an imprint at one edge. If enough standard forms are used the machine may be provided with bottom stops for them. Here the switch operating arms 84′ may serve as bottom stops. The operator may hold the medium at any depth desired and the parts are so disposed as to provide a good sighting for holding the medium. Assuming that the medium is to be inserted full-depth of the space, it will have to pass the end of the arm 82′. For this purpose the upper end of the arm is shortened and may be rounded on the upstream corner, as at 82a (FIG. 10), to ease the medium over. If desired, the cover may be bent up here to cover the end of the arm.

In addition to the switches, the location of the pushbutton PB is shown in FIGS. 10 and 11. Other locations may be selected for different uses or different orientations of the machine.

The part of the casing 29 above the platen may be hinged to swing out if desired. As shown in FIG. 10 the hinge would be near the lower right-hand corner which has been cut away.

It is seen that the enclosure hereby provided has generally standard end parts with the longitudinal part made as a simple wrap-around shape which can be made of standard shaped pieces which can be cut off to any length desired for different machines. Other than this, it is only necessary to make the platen and rails of different length, as needed, and different length models can be provided largely from standard stock on demand.

Figure 12:
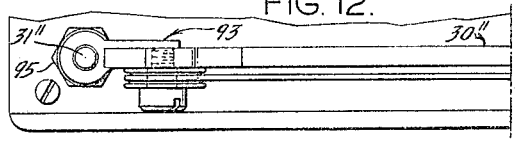
FIG. 12 is a fragmentary view like the bottom left-hand corner of FIG. 1 showing a modified cam rail mounting.
Figure 13:
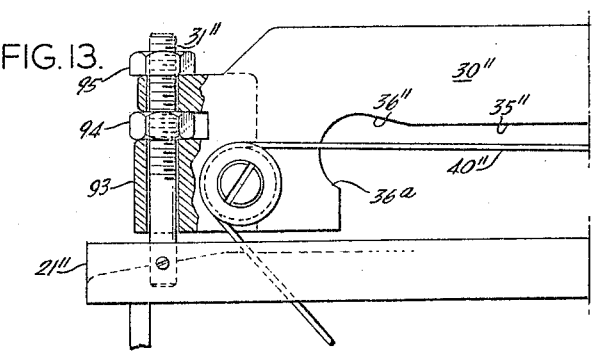
FIG. 13 is a side view partly in section of the parts shown in FIG. 12.

FIGS. 12 and 13 show a modified form of cam track rail 30″ in which the relieved portion 36″ has a shoulder 36a to aid in holding the roll shaft up after it has been lifted up at the end of the stroke by the cable 40″. The rail is provided with fittings 93 which are apertured to receive screws 31″ and slotted to receive an adjusting nut 94 which fits closely to move the rail in either direction. A lock nut 95 is suitably operated when making adjustments. In FIG. 13 the screw is shown as secured to a platen 21″ but in an open throat arrangement it would be anchored on the frame part located above the cam track rail. If desired, larger hand operated knurled thumb nuts may be provided instead of the polygonal wrench nuts shown.

The operation of either form of the imprinting device is substantially the same except that very wide media can be inserted in the second form. Either the ticket operation of the switch S1 or the hand operation of the pushbutton PB will initiate a stroke, first in one direction and then in the other. The cable will keep the roll against the cam and will raise it at each end of the stroke to clear the space below it for insertion or removal of the credit card and ticket.

The form shown in FIGS. 14–16 is a modification of the open-throat form of FIGS. 10 and 11 in which the strand or cable runs are made equal and both shortened by mounting a cable operating shaft 100 in bearings 101 secured to a frame part 20a.3 of frame 20.3.

The shaft 100 is positively driven by the gear shaft 42.3 of motor M.3 through a timing belt or chain 102 mounted on toothed pulleys 103, 104 on the shaft 100 and drive shaft, 42.3 respectively. The cables 40.3 are driven by capstans or drums 41.3 secured to the shaft 100 and are attached to the ends of shaft 24.3 as before.

The shaft 24.3 carries an imprinting roll 22.3 and spacer 26.3 and moves along cam track rails 30.3 over platen 21.3 as before. Sheaves 53.3 mounted on shafts 54.3 guide the cables at the ends of the cam tracks of the rails 30.3.

The rails 30.3 are adjusted relative to the platen 21.3 by adjusting screws 31.3 secured to the rails through adjusting nuts 94.3 and lock nuts 95.3 of the hand-turned type coacting with suitable projections of fittings 93.3 carried by the frame part 20a.3.

The form shown in FIGS. 17–20 is similar to the form of FIGS. 14 and 15 except that the drive strands are all of the timing belt type, permitting the cable winding capstans to be eliminated. The lay shaft 100 could be used but it also can be eliminated by a simplification of the drive and that is done.

The gear drive shaft 42.4 has a toothed pulley 104.4 which drives a timing belt or chain 102.4 which drives a toothed pulley 103.4 fast on a shaft 54.4. The shaft 54.4 extends across both rails 30.4, having bearings 106 thereon, and at each side of the rails drives a toothed pulley 53.4 for a flexible strand drive in the form of a timing belt 40.4.

Figure 19:
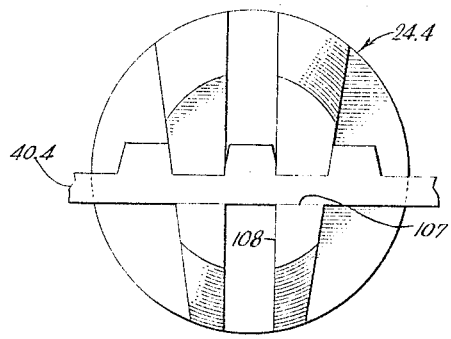
FIG. 19 is an enlarged partial end elevation taken on the line 19—19 of FIG. 17.
Figure 20:
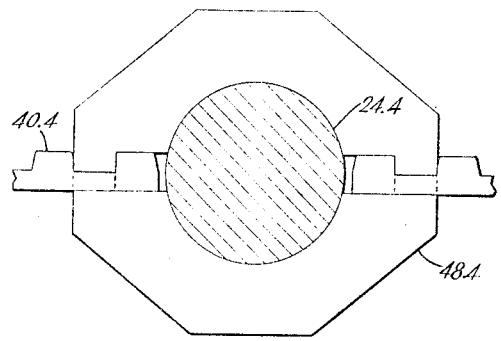
FIG. 20 is an enlarged partial end elevation taken on the line 20—20 of FIG. 17.

As shown in FIGS. 19, 20 the timing belts 40.4 are secured by their own teeth to the ends of the shaft 24.4 of the imprinting roll 22.4. At the outer end of the shaft (FIG. 19) there are transverse slots 107, 108 for the belt strand and one of its teeth or lugs respectively; and at the head end (FIG. 20) washer 48.4 is provided at one end with slots 109 on each side of the shaft, beyond an uncut portion of the washer, for receiving the ends and at least one tooth of the timing belt.

Figure 17:
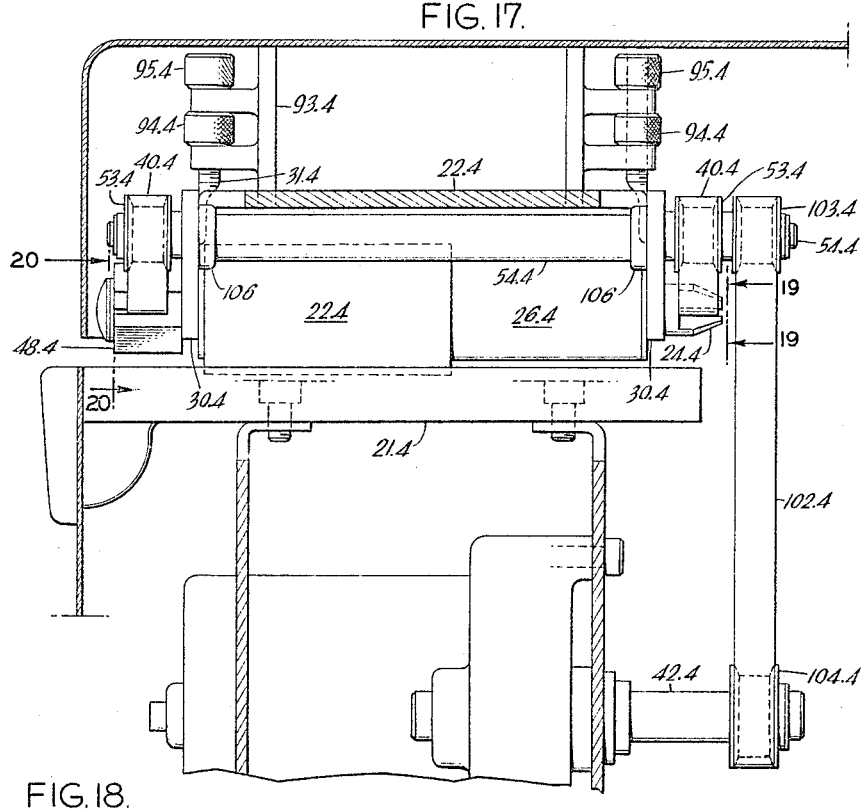
FIG. 17 is a partial elevational view like FIG. 14 but showing another modified form of drive mechanism.
Figure 18:
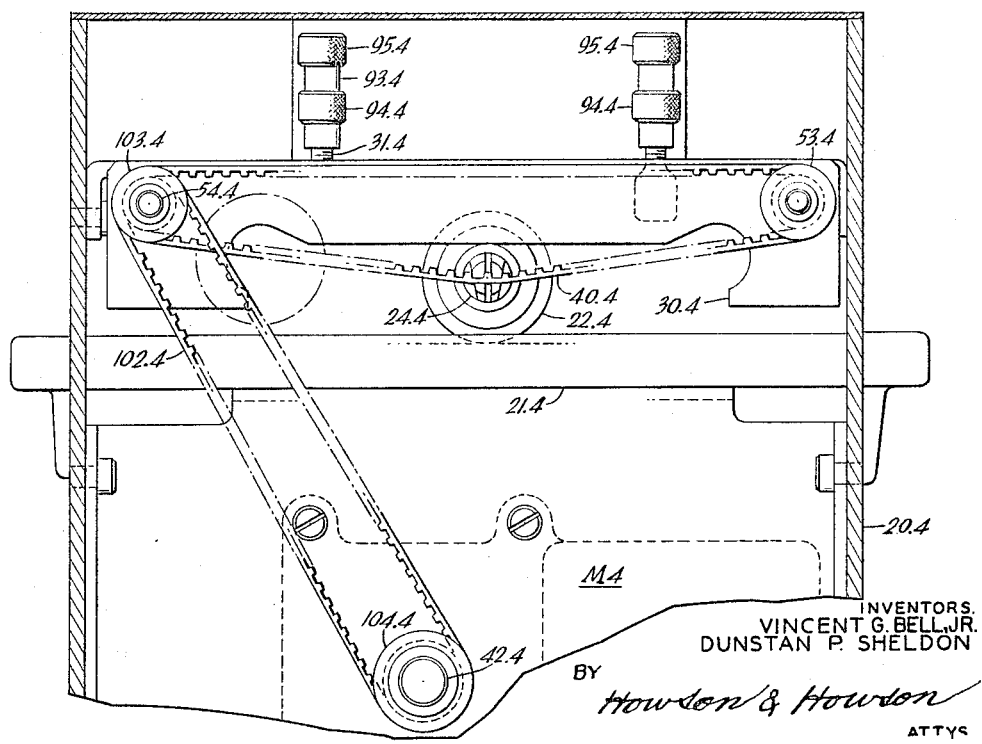
FIG. 18 is a right end elevation of the parts shown in FIG. 17.

Other parts shown in FIGS. 17 and 18 are the same or very similar to parts in FIGS. 14 and 15 and the same reference characters are used with the suffix (.4).

Figure 21:
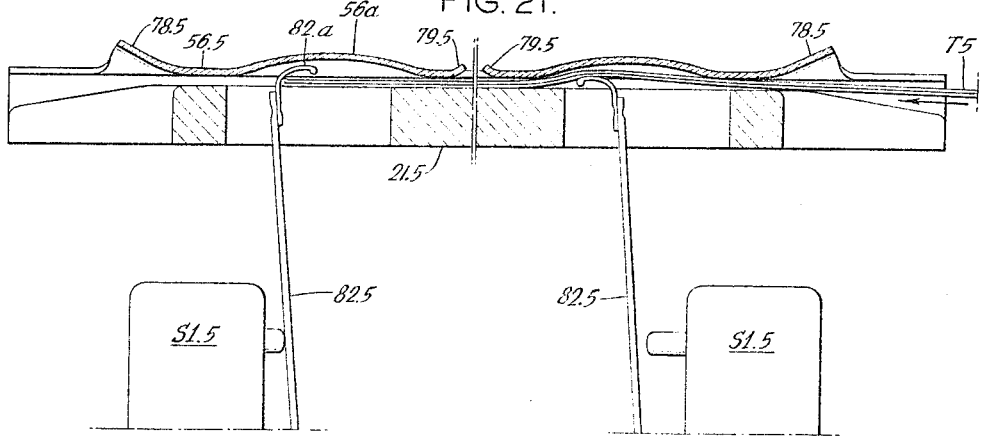
FIG. 21 is a partial enlarged and shortened view similar to FIG. 6, inverted, showing a dual-end ticket-insertion arrangement.

FIG. 21 shows a modification of the first form which provides for the reception of a ticket from either end, as may be desired. There are two starting switches S1.5 in parallel—and as shown in FIG. 9 may be in parallel with a starting pushbutton—each with an operating arm 82.5 extending up through an aperture in the platen 21.5 beneath the hold-down plate 56.5. Each arm 82.5 on the end is provided with a light spring extension 82a which is curved over beneath a raised blister-like projection or protuberance 56a of the hold-down plate which allows the ticket T.5 to slide over the upper end of the near switch which is first encountered and to engage beneath the spring end of the arm of the second switch encountered so as to operate it. The parts are so designed that the ticket does not operate the other switch when being removed. The inclined flanges 78.5 and 79.5 are suitably formed to accommodate the two-ended ticket insertion.

It is seen that the invention provides a simple and dependable imprinting device which will have a wide range of service.

While certain embodiments of the invention have been described to illustrate the principles of the invention, it is to be understood that there may be various embodiments and modifications within the general scope of the invention.

We claim:
1. An imprinting device, comprising in combination, a platen for holding printing elements and a medium to be imprinted by said elements, an elongated cam rail closed at both ends above said platen having a longitudinal cam track with a central pressure portion and a raised relief portion at at least one end of the pressure portion, an imprinting roll having a portion underlying said cam track and movable along said cam track to squeeze against the printing elements and medium when travelling along said pressure portion to imprint on said medium, and to stand in a raised position when in the raised relief portion at an end to permit removal and insertion of said medium, a cable connected to an end of said roll for reciprocating it along said cam track in pressure engagement therewith between said ends, and guide and support means for said cable at each end of the cam track, the cable guide means at the end having the relief portion being disposed in relation to said cam track pressure portion and relief portion as to lift the roll up into the relief portion, and means for reciprocating said cable.

2. An imprinting device, comprising in combination, a platen for holding printing elements and a medium to be imprinted by said elements, an elongated cam rail closed at both ends with a cam track located above said platen, said cam track having a longitudinal central pressure portion and raised relief portions at each end, an imprinting roll having cam follower elements underlying said cam track and movable along said cam track for squeezing said medium against the printing elements along the elongated portion of the cam track and moving clear in said raised relief portions, and means for reciprocating said roll along said cam track, said roll moving means including a flexible means and sheaves at each end of the cam track supporting said flexible means in pressure engagement between said ends with said cam track pressure and relief portions to lift the roll into the relief cam portions at each end to relieve the pressure of the roll on said medium, and means for reciprocating said flexible means.

3. An imprinting device, comprising in combination, a platen for holding printing elements and a medium to be imprinted, spaced elongated cam rails closed at both ends on each side of the platen, said cam rails having parallel cam tracks each including a longitudinal central pressure portion and a raised relief portion at at least one end, an imprinting roll having cam follower means at each end underlying said cam tracks for movement along said cam track in selected spaced relation to said platen, and flexible means entraining said roll at each end for reciprocating it along said cam tracks in engagement therewith between said ends, and support means for said flexible means at each end of the cam tracks, the support means for the end having the raised relief portion being located in greater spaced relation to said platen than that portion of the flexible means opposite the track pressure portion to lift the roll above said medium, and means for reciprocating said flexible means.

4. An imprinting device comprising in combination: a platen, a slot opening from one side of the platen for inserting a printing plate with printing elements thereon, an imprinting roll movable above said printing plate and platen for printing upon a medium above the plate, and stop means for limiting the inward inserted position of said printing plate, said stop means comprising a spring plate secured beneath the platen, and an upturned flange on the spring plate extending up through an opening in the platen into the path of the printing plate and yieldable towards the platen when the roll passes thereover, said upturned flange being provided with a short, lateral flange overlying the edge of said printing plate to prevent it from rising and moving past the upturned flange when inserted.

5. An imprinting device as set forth in claim 4 in which the ends of said upturned flange stand above said platen and have curved end corners to cause an impression receiving sheet inserted thereover to be raised above said printing plate being held by said lateral flange.

6. An imprinting device, comprising in combination: a platen, an imprinting roll including a roll element mounted for movement back and forth along said platen, a cam rail having a longitudinal cam confining said roll for movement along said platen, a flexible means connected with said roll element to move said roll back and forth in engagement with said cam rail, and power means for moving said flexible means back and forth, said power means including a reversible power shaft, a capstan including two turnable parts, the flexible means having one end wound in one direction on the capstan and secured to one part thereof and having the other end wound in the reverse direction on the capstan and secured to the other part thereof, said capstan parts, during assembly, being turned until the flexible means is taut to engage said roll element with said cam rail and then made fast on the shaft, one part of said capstan comprising a drum portion and a flange made fast to the shaft in a turned position with one end of the flexible means secured thereto, and the other part of the capstan comprising a flange turnable on the drum portion and secured thereto with the flexible means taut.

7. An imprinting device, comprising in combination: a platen providing support for printing media and a medium to be imprinted, an imprinting roll movable over said platen, means to hold said roll toward said platen for imprinting on said medium by said printing media, and means for moving said roll back and forth along said platen, said roll-moving means including cables operatively connected to the end of said roll, a reversible power shaft, and capstans on each end of said shaft, each capstan having the ends of one of said cables oppositely wound thereon and connected thereto, said power shaft being arranged with its axis parallel to the axis of said roll, having an end exposed at one side of the platen, having two capstans on the exposed end, and having a capstan connected to each cable, both cables crossing through the plane of the top surface of the platen and both cables being located on one side of the platen to leave the other side open for the insertion of media.

8. An imprinting device, comprising in combination, a platen providing support for printing media and a medium to be imprinted, an imprinting roll movable over said platen, power drive means and drive connections for driving said roll to move back and forth, means for receiving a ticket at each end of the platen, and control means including a movable control element located near each end of the platen for controlling said power drive means, each control element having a portion engaged by a ticket introduced in the receiving means at the end of the platen remote from said control element and non-operatively engaged by a ticket introduced at the other end of the platen.

9. In an imprinting device, the combination of: a platen having a surface to support a printing media and a medium to be imprinted; an elongated cam means having a cam track closed at both ends and including a central track pressure portion spaced from said platen surface for an imprinting operation and a relief portion spaced a greater distance from said platen surface; a roll means movable reciprocally over said surface beneath said cam track and having engagement with said cam means; and means for reciprocally moving said roll means along said pressure portion and into said relief portion including a flexible means extending along said cam means and having a connection to said roll means in spaced relation to said surface, and guide means at opposite ends of said cam means engaged by said flexible means in greater spaced relation to said platen surface than the connection of the flexible means to the roll means whereby said roll means is movable in engagement with said pressure portion and is urged into said relief portion, and means for reciprocating said flexible means.

10. In an imprinting device the combination of: a platen having a platen surface to support a printing media and a medium to be imprinted; an elongated cam means having a cam rail closed at both ends and including a central track pressure portion spaced from said platen surface and facing said platen surface for an imprinting operation, said cam means having a relief portion spaced a greater distance from said platen surface at at least one end of said track pressure portion; a roll means having an axis and movable over said platen surface underlying said cam rail, and having engagement with said cam means; and means for reciprocally moving said roll means over said platen surface and along said pressure portion and into said relief portion including a flexible means extending along said cam means and having a connection to said roll means at said axis of said roll means, and guide means at at least one end of said cam means in greater spaced relation to said platen surface than said axis of said roll means for maintaining said roll means in pressure engagement between said ends with said track pressure and track relief portions for urging said roll means into said relief portion at the end of an imprinting operation, and means for reciprocating said flexible means.

References Cited by the Examiner
UNITED STATES PATENTS

| | | |
|---|---|---|
| 479,579 | 7/1892 | Vaughn _____ 101—269 |
| 671,729 | 4/1901 | Lee _____ 101—269 |
| 1,020,190 | 3/1912 | Cossar _____ 101—260 |
| 2,077,724 | 4/1937 | Svenson. |
| 2,606,494 | 8/1952 | Vogt _____ 101—269 |
| 2,651,988 | 9/1953 | Thomas et al. _____ 101—123 |
| 2,768,749 | 10/1956 | Easterday _____ 254—147 X |
| 2,831,359 | 4/1958 | Carle. |
| 3,018,725 | 1/1962 | Maul et al. _____ 101—269 |
| 3,045,589 | 7/1962 | Hill et al. _____ 101—269 X |
| 3,134,324 | 5/1964 | Schwaninger _____ 101—269 |

ROBERT E. PULFREY, *Primary Examiner.*

EUGENE R. CAPOZIO, *Examiner.*

J. REID FISHER, *Assistant Examiner.*